(No Model.)

L. MILLER.
TRUCK WHEEL ATTACHMENT FOR HARVESTERS.

No. 552,666. Patented Jan. 7, 1896.

Witnesses

Ravis Miller
Inventor

UNITED STATES PATENT OFFICE.

LEWIS MILLER, OF AKRON, OHIO.

TRUCK-WHEEL ATTACHMENT FOR HARVESTERS.

SPECIFICATION forming part of Letters Patent No. 552,666, dated January 7, 1896.

Application filed April 29, 1895. Serial No. 547,501. (No model.)

*To all whom it may concern:*

Be it known that I, LEWIS MILLER, a citizen of the United States, residing at Akron, county of Summit, and State of Ohio, have invented a new and useful Improvement in Truck-Wheel Attachments for Harvesters, of which the following is a specification.

My invention relates to the cast-iron supporting-arm and the manner of securing it to the harvester-frame.

The object of my invention is to produce an inexpensive means of securing and attaching the truck-wheels to a harvester, the axles of the truck-wheels being cast integral with the supporting-arm that is secured to the main cross-sill of the harvester, and by hooking one end of the supporting-arm over the top of the main cross bar or sill of the harvester the under side of the sill will then rest on the flat surface of the supporting-arm and may also be secured by a convenient bolt of the harvester, while upwardly-projecting lugs receive and fasten it to the main cross-bar, and thus I dispense entirely with the connecting reach or axle that has heretofore been required and which is objectionable as being heavy and bulky to carry, also difficult to attach and detach, and expensive.

It is well known that the truck-wheel attachment has become an indispensable accompaniment to the harvester and binding-machine of the present day, as the travel of the machine on the country road while in transit from field to field is liable to cause injury to the machine, and it is much safer and conducive to economy of time to provide means for its rapid transportation over rough and muddy roads by mounting it on trucks the wheels of which are under the binder and secured to the main wheel-frame and at right angles thereto. The harvester main wheel being raised free from the ground, and the harvester-tongue being attached to the grain end of the harvester-carrier platform, the machine is so balanced that the truck-wheels support it in proper adjustment without weight on the horses' necks, and there is no liability of disarranging any parts of the binding machinery or harvester in roadway or crossing fields, and the convenient and simple manner of attaching and detaching the truck-wheels to the harvester-frame saves time and labor over the use of devices heretofore required.

My invention is illustrated in the accompanying drawings, in which—

Figure 1:
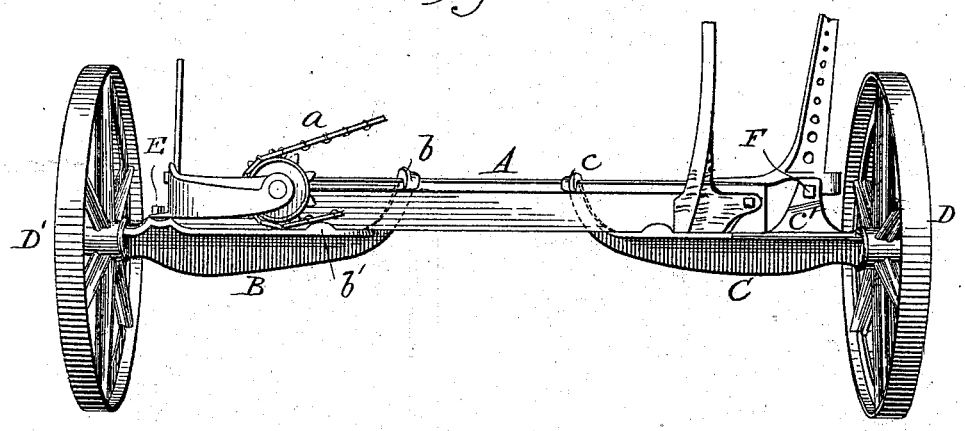
Figure 2:
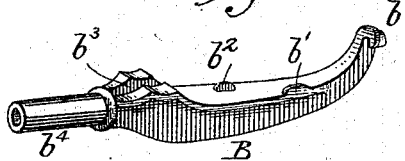
Figure 3:
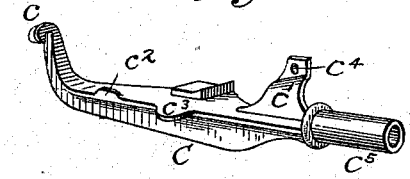

Figure 1 shows the axle-supporting arms and truck-wheels secured to the main cross-sill of the harvester. Fig. 2 is the rear axle-supporting bar and Fig. 3 the front axle supporting-bar, which are secured respectively to the front and rear side of the harvester and its main wheel (not shown) and at a point beneath the harvester elevator and binder and at right angles to the main wheel.

In the identifying letters of reference, A alludes to the main cross-bar or transverse sill of the harvester-frame located at the side and parallel with the main wheel of the harvester.

B is the supporting-bar of the rear truck-wheel $D'$.

C is the corresponding front bar and D its wheel; E F, securing-bolts that are a part of the harvester.

$b\ c$ are locking-hooks formed integral with the supporting-arms.

$b^4\ c^5$ are hollow axles.

$C'\ C''\ C^6\ b'\ b''$ are upwardly-projecting locking-lugs formed integral with the supporting-arms.

$b^3\ c^4$ are bolt-holes; $C^3$, supporting-finger.

In operation the supporting-bars are placed under the harvester and elevator frame as it rests on its main wheel on the ground and the locking-hooks $b\ c$ hooked over the main sill A, and being brought to a horizontal position on the under side of the sill, each part fits snugly to its place, and the harvester-bolts having the nuts tightened up, the truck is thus formed and secured to the harvester, and the raising of the wheel by the usual means leaves the machine supported on the truck-wheels and grain-wheel, and the tongue being transferred and secured to the platform at the latter point and the horses being attached thereto, the machine is perfectly balanced and can be safely moved without revolving or disturbing the harvester and binder actuating mechanism.

Having described my invention, what I claim, and desire to secure by Letters Patent, is—

1. In a harvester truck the wheel axle having its harvester frame supporting bar formed integral therewith and provided with the upwardly curved locking hooks to receive and hold the harvester frame substantially as shown and described.

2. A harvester truck provided with suitable upwardly projecting lugs on its horizontal bearing face and the vertical securing arm to lock over the frame of the harvester and thereby form in connection with the harvester sill a continuous support as a complete truck wheel attachment substantially as shown and described.

3. A harvester truck wheel attachment having a horizontal bearing for the support of the harvester frame and a vertical arm provided with transverse hooks for locking over the top of the frame substantially as shown and described.

4. In a harvester truck the combination of the harvester sill A, the wheel supporting arms B, C, and their transverse locking hooks, $b$, $c$, substantially as described.

5. In a harvester truck the combination of the harvester sill A, the wheel supporting arms B, C, and their transverse locking hooks, $b$, $c$, and their securing bolts E, F, substantially as shown and described.

LEWIS MILLER.

Witnesses:
 WALTER K. MEANS,
 O. L. SADLER.